United States Patent
Czaplewski et al.

(10) Patent No.: US 10,081,125 B2
(45) Date of Patent: Sep. 25, 2018

(54) METHOD TO DETECT AND REMOVE GAS BUBBLES FROM MOLTEN SUBSTRATE TO PREVENT HOLLOW FIBER FORMATION

(71) Applicant: International Business Machines Corporation, Armonk, NY (US)

(72) Inventors: Sarah K. Czaplewski, Rochester, MN (US); Joseph Kuczynski, North Port, FL (US); Jason T. Wertz, Pleasant Valley, NY (US); Jing Zhang, Poughkeepsi, NY (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 14/803,899

(22) Filed: Jul. 20, 2015

(65) Prior Publication Data

US 2017/0021548 A1   Jan. 26, 2017

(51) Int. Cl.
   *C03B 37/02*   (2006.01)
   *C03B 37/07*   (2006.01)
   (Continued)

(52) U.S. Cl.
   CPC .......... *B29C 47/92* (2013.01); *B29C 47/0071* (2013.01); *B29C 47/0879* (2013.01);
   (Continued)

(58) Field of Classification Search
   CPC . B29C 47/0879; B29C 47/0894; B29C 47/92; B29C 2947/92228;
   (Continued)

(56) References Cited

U.S. PATENT DOCUMENTS 4,021,217 A    5/1977   Bondybey et al.
4,174,198 A *  11/1979  Kinoshita .............. B01D 29/46
                                                    210/407
(Continued)

FOREIGN PATENT DOCUMENTS

GB       619769 A      3/1949
JP     55051731 A      4/1980
(Continued)

OTHER PUBLICATIONS

Liu et al., Joint transform correlator for the detection of defects in optical fibers, Optical Engineering, vol. 37, No. 5, May 1998, 7 pages, Society of Photo-Optical Instrumentation Engineers, spiedigitallibrary.org (online), <http://dx.doi.org/10.1117/1.601662>.

(Continued)

*Primary Examiner* — Yogendra N Gupta
*Assistant Examiner* — Joseph S Leyson
(74) *Attorney, Agent, or Firm* — Patterson + Sheridan, LLP

(57) ABSTRACT

Method and apparatus for removing bubbles from a molten substrate. The molten substrate from a furnace passes through a downtube to reach additional manufacturing tools, such as an extrusion bushing. One or more ultrasonic sensors are arranged along the downtube. The ultrasonic sensor(s) transmit ultrasonic energy into the molten substrate and measure a characteristic of the ultrasonic energy, such as a propagation time for the ultrasonic energy to be reflected back to the ultrasonic sensor(s). A bubble is detected when a change in the characteristic of the ultrasonic energy is detected. When a bubble is detected, flow through the downtube is diverted to a duct to remove a slug of molten substrate that includes the bubble.

15 Claims, 9 Drawing Sheets

(51) Int. Cl.
| | |
|---|---|
| B29C 47/92 | (2006.01) |
| B29C 47/00 | (2006.01) |
| B29C 47/08 | (2006.01) |
| C03B 37/012 | (2006.01) |
| C03B 5/225 | (2006.01) |
| C03B 5/24 | (2006.01) |
| C03B 37/085 | (2006.01) |
| C03B 5/26 | (2006.01) |
| C03B 7/00 | (2006.01) |
| C03B 7/02 | (2006.01) |
| B29L 31/00 | (2006.01) |

(52) U.S. Cl.
CPC .......... *B29C 47/0894* (2013.01); *C03B 5/225* (2013.01); *C03B 5/24* (2013.01); *C03B 5/262* (2013.01); *C03B 7/005* (2013.01); *C03B 7/02* (2013.01); *C03B 37/01274* (2013.01); *C03B 37/02* (2013.01); *C03B 37/07* (2013.01); *C03B 37/085* (2013.01); *B29C 2947/92228* (2013.01); *B29C 2947/92295* (2013.01); *B29C 2947/92304* (2013.01); *B29C 2947/92361* (2013.01); *B29C 2947/92485* (2013.01); *B29L 2031/731* (2013.01)

(58) Field of Classification Search
CPC ...... B29C 2947/9238; C03B 37/01274; C03B 37/02; C03B 37/07; C03B 37/085
See application file for complete search history.

(56) References Cited

U.S. PATENT DOCUMENTS

| | | | |
|---|---|---|---|
| 4,924,087 A | 5/1990 | Bailey et al. | |
| 5,330,548 A | 7/1994 | Danzuka et al. | |
| 5,352,258 A * | 10/1994 | DeGreve | C03B 3/00 65/134.4 |
| 5,436,719 A | 7/1995 | Doles et al. | |
| 5,469,252 A | 11/1995 | Doles et al. | |
| 5,776,222 A | 7/1998 | Kopylov et al. | |
| 5,880,825 A | 3/1999 | Jakobsen et al. | |
| 6,212,936 B1 | 4/2001 | Meisberger | |
| 7,940,382 B2 | 5/2011 | Ikeda et al. | |
| 8,689,588 B2 | 4/2014 | Hirayama et al. | |
| 2008/0221814 A1 | 9/2008 | Trainer | |
| 2012/0167633 A1 | 7/2012 | Hirayama et al. | |
| 2014/0167633 A1 | 6/2014 | Zhang | |
| 2016/0207814 A1 | 7/2016 | Demott et al. | |

FOREIGN PATENT DOCUMENTS

| | | |
|---|---|---|
| JP | 07229813 A | 8/1995 |
| JP | 08208264 A | 8/1996 |
| JP | 08319131 A | 12/1996 |
| JP | 2003192373 | 7/2003 |
| KR | 1020030067610 A | 8/2003 |
| WO | 2008018997 A2 | 2/2008 |

OTHER PUBLICATIONS

Anonymous, Method for Detection of Hollow Glass Fibers, an IP.com Prior Art Database Technical Disclosure, Sep. 20, 2011, 3 pages, ip.com (online), IP.com No. IPCOM000211112D.

International Business Machines Corporation: "Updated Appendix P: List of IBM Patents or Patent Applications Treated as Related", filed on Mar. 21, 2017.

* cited by examiner

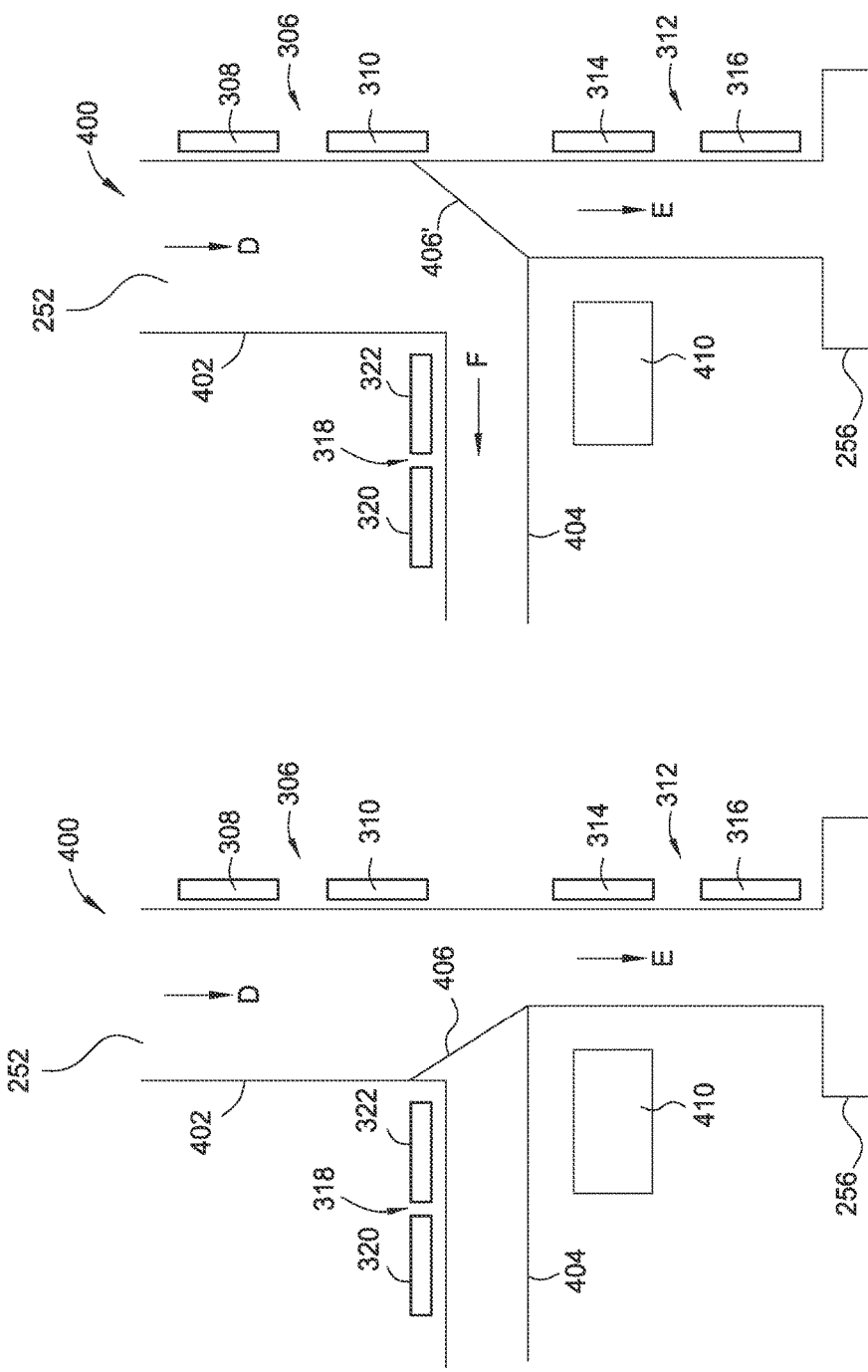

METHOD TO DETECT AND REMOVE GAS BUBBLES FROM MOLTEN SUBSTRATE TO PREVENT HOLLOW FIBER FORMATION

BACKGROUND

The present invention relates to fiber formation, and more specifically, to fiber formation from a molten substrate.

Printed circuit boards are often made with a mat of woven glass fibers within a cured resin substrate. The glass fibers provide structural reinforcement for the resin. The glass fibers are formed by extruding molten glass. Occasionally, a bubble in the molten glass is carried into the extrusion process. In such cases, the bubble can be contained in a formed thread in an elongated form. As a result, the thread includes a hollow region.

If such a hollow thread is used in a printed circuit board, the hollow thread could cause a circuit failure, such as a short circuit or an open circuit. For example, holes or vias are often drilled through a printed circuit board. If such a hole is drilled through a hollow thread, a conductive circuit material could travel through the hollow portion of the thread, forming a conductive anodic filament (CAF). The CAF could inadvertently connect two circuit elements that are not supposed to be connected, resulting in a short circuit or bad circuit.

As the density of circuit elements on printed circuit boards increases, the likelihood that a hollow thread will cause a circuit failure also increases. Thus, avoiding the use of hollow threads in printed circuit boards is important to reduce the number of faulty circuit boards. Currently, random samples of formed glass threads are pulled from production and checked for hollow threads. In the event a hollow thread is discovered, the sample and at least a portion of a batch from which the sample came are discarded. Such random sampling is imperfect because a hollow thread could make it through the process undetected. Furthermore, such a process could result in large amounts of scrap thread when thread is discarded due to a discovered hollow thread.

SUMMARY

According to one embodiment of the present invention, an apparatus for supplying a molten substrate includes a downtube adapted to receive the molten substrate at an upstream end of the downtube and to distribute the molten substrate at a downstream end of the downtube. The apparatus also includes an ultrasonic sensor arranged along the downtube. The ultrasonic sensor is operable to detect bubbles in the molten substrate in the downtube. The apparatus also includes a duct arranged along the downtube. The duct is operable to remove a slug of the molten substrate from the downtube upon the ultrasonic sensor detecting a bubble in the molten substrate.

According to one embodiment of the present invention, an apparatus for forming fibers from a molten substrate includes a furnace operable to melt a substrate supply into a molten substrate. The apparatus also includes a downtube that includes an upstream opening and a downstream opening. The upstream opening is in fluid communication with an outlet of the furnace. The downtube includes an ultrasonic sensor arranged along the downtube. The ultrasonic sensor is operable to detect bubbles in the molten substrate in the downtube. The downtube also includes a duct arranged along the downtube. The duct is operable to remove a slug of molten substrate upon the ultrasonic sensor detecting a bubble in the slug of molten substrate. The apparatus also includes a bushing in fluid communication with the downstream end of the downtube, wherein the bushing includes a plurality of extrusion ports therethrough. The apparatus also includes a winding apparatus operable to pull threads of molten substrate through the extrusion ports and form the threads into a winding of threads.

According to one embodiment of the present invention, a method for removing bubbles from a molten substrate includes transmitting ultrasonic energy into a downtube through which a molten substrate is flowing. The method also includes detecting a characteristic of the ultrasonic energy. The method also includes, upon detecting a predetermined change to the characteristic of the ultrasonic energy, diverting a slug of molten substrate from the flow of molten substrate in the downtube to a duct.

BRIEF DESCRIPTION OF THE SEVERAL VIEWS OF THE DRAWINGS

FIG. 4A is a schematic view of an apparatus, according to at least one embodiment, that includes a downtube and a flapper valve arranged in the downtube, wherein the flapper valve is arranged in a position to direct molten glass through the downtube;

FIG. 4B is a schematic view of the apparatus of FIG. 4A, in which the flapper valve is arranged in a position to direct the molten glass into a duct;

DETAILED DESCRIPTION

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1A:
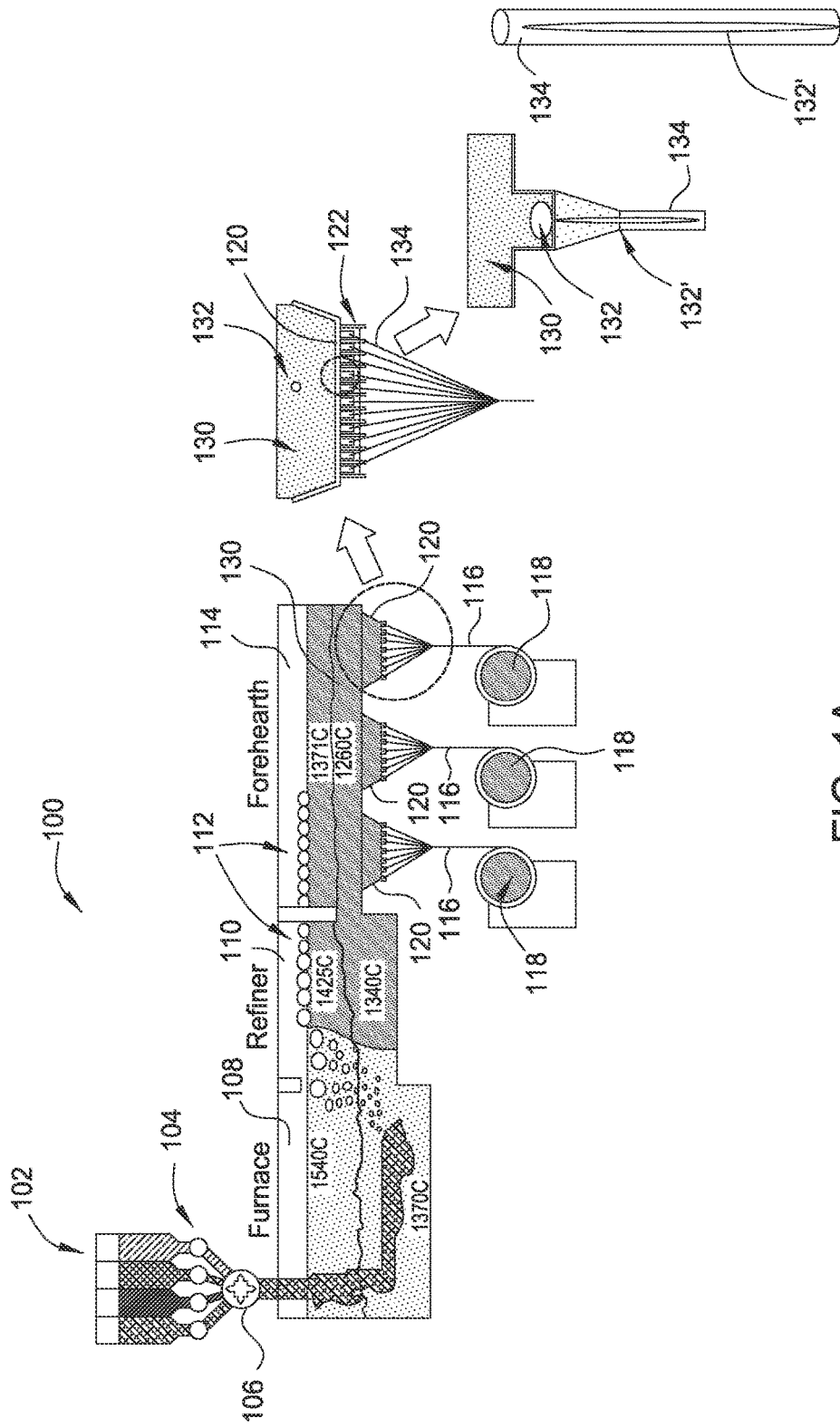
FIG. 1A is a schematic depiction of an apparatus for melting glass and extruding the glass into glass fibers.
Figure 1B:
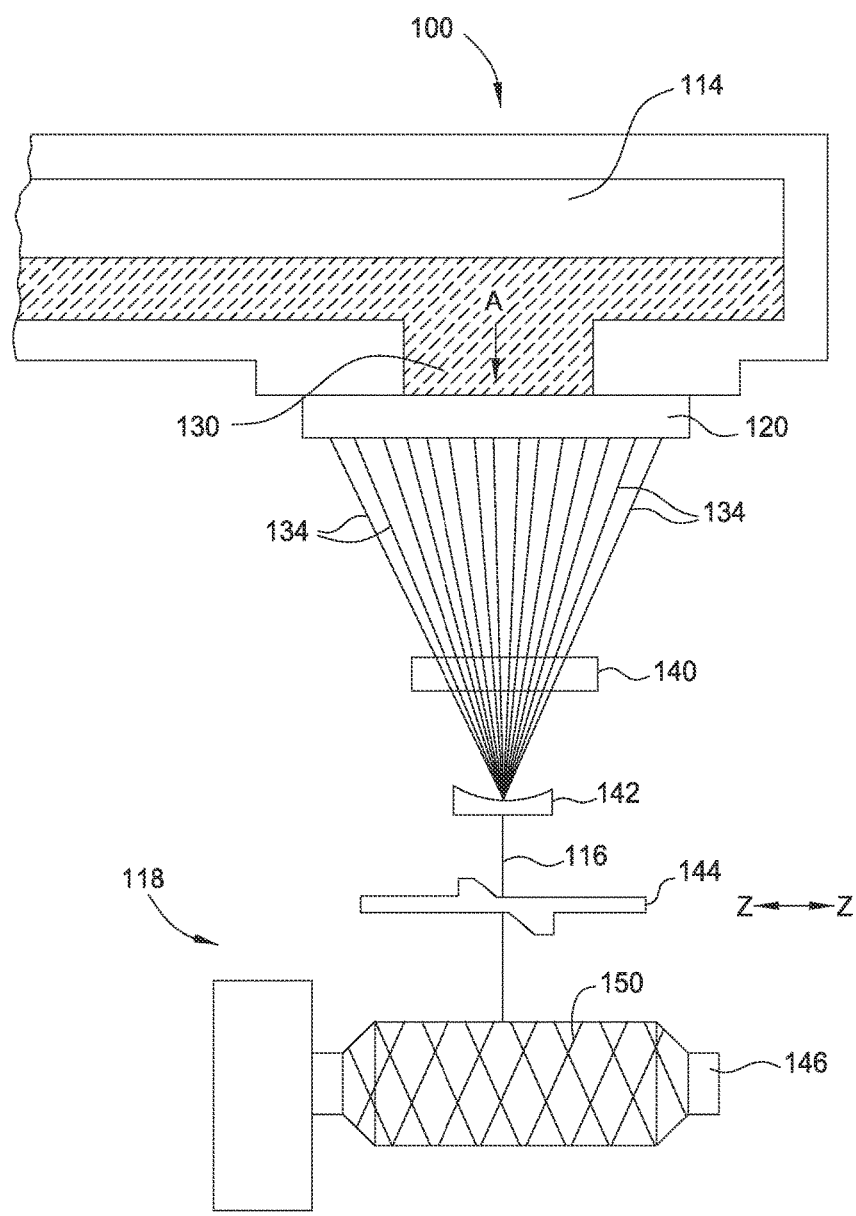
FIG. 1B is a detailed schematic depiction of a winding portion of the apparatus shown in FIG. 1A.

FIGS. 1A and 1B illustrate an apparatus 100 for forming glass threads 116 from a molten glass source. The apparatus 100 starts with raw materials 102, such as a dry mixture of silicas, limestone, clay, and boric acid. The raw materials 102 pass-through measuring devices 104 that distribute the raw materials in the proper amounts or proportions. The raw materials 102 then pass through a mixer 106, and the mixed raw materials 102 are then dropped into a furnace 108. The furnace 108 melts the raw materials to a temperature of between 1370° C. and 1540° C. to form a molten glass mixture. The molten glass mixture flows into a refiner 110 where the molten glass mixture cools to a temperature of between 1340° C. and 1425° C. The molten glass mixture homogenize as it flows into the refiner 110. Additionally, gas bubbles 112 in the molten glass mixture (e.g., caused by entrapment of air or the release of gas during decomposition of water, carbonates, and/or organic matter in the raw materials) travel to the surface of the molten glass mixture refiner 110. After the refiner 110, the molten glass mixture passes into a forehearth 114 where the molten glass mixture cools to a temperature of between 1260° C. and 1371° C. In the forehearth 114, any remaining bubbles 112 may float to the surface of the molten glass mixture, resulting in a molten glass mixture 130 that is ready to be extruded into glass threads.

The illustrated apparatus 100 includes three bushings 120 arranged under the forehearth 114. In various embodiments, the apparatus 100 can include more or fewer than three bushings 120. The molten glass 130 travels in the direction of arrow A (shown in FIG. 1B) into the bushings 120. The bushings 120 include nozzles 122 through which the molten glass can be extruded as individual glass threads 134. Optionally, the individual glass threads 134 pass through a sizer 140, which finalizes the diameter of the individual glass threads 134. The individual glass threads 134 can be formed into a glass strand 116 by a strand former 142, which braids, twists, and/or otherwise combines the individual glass threads 134. The glass strand 116 can then be wound onto winders 118. The winders 118 include a rotating spool 146. A traversing mechanism 144 can move in the direction of arrows Z to laterally distribute the glass strand 116 about the spool 146. For example, the glass strand 116 can be arranged on the spool 146 in a crisscross or woven pattern 150.

In various aspects, the process of forming the glass strand 116 is performed in a continuous manner, meaning that a spool of the glass strand is formed on the spool 146 until the spool 146 is full or otherwise reaches a predetermined size.

As discussed above, occasionally, a gas bubble 132 can remain entrapped in the molten glass mixture 130. When the bubble 132 reaches one of the nozzles 122 in the bushing 120, the gas bubble can be extruded into an elongated hollow 132' within an individual glass thread 134. As discussed above, such an elongated hollow 132' in the thread 134 could cause an electrical failure of a printed circuit board.

Figure 2:
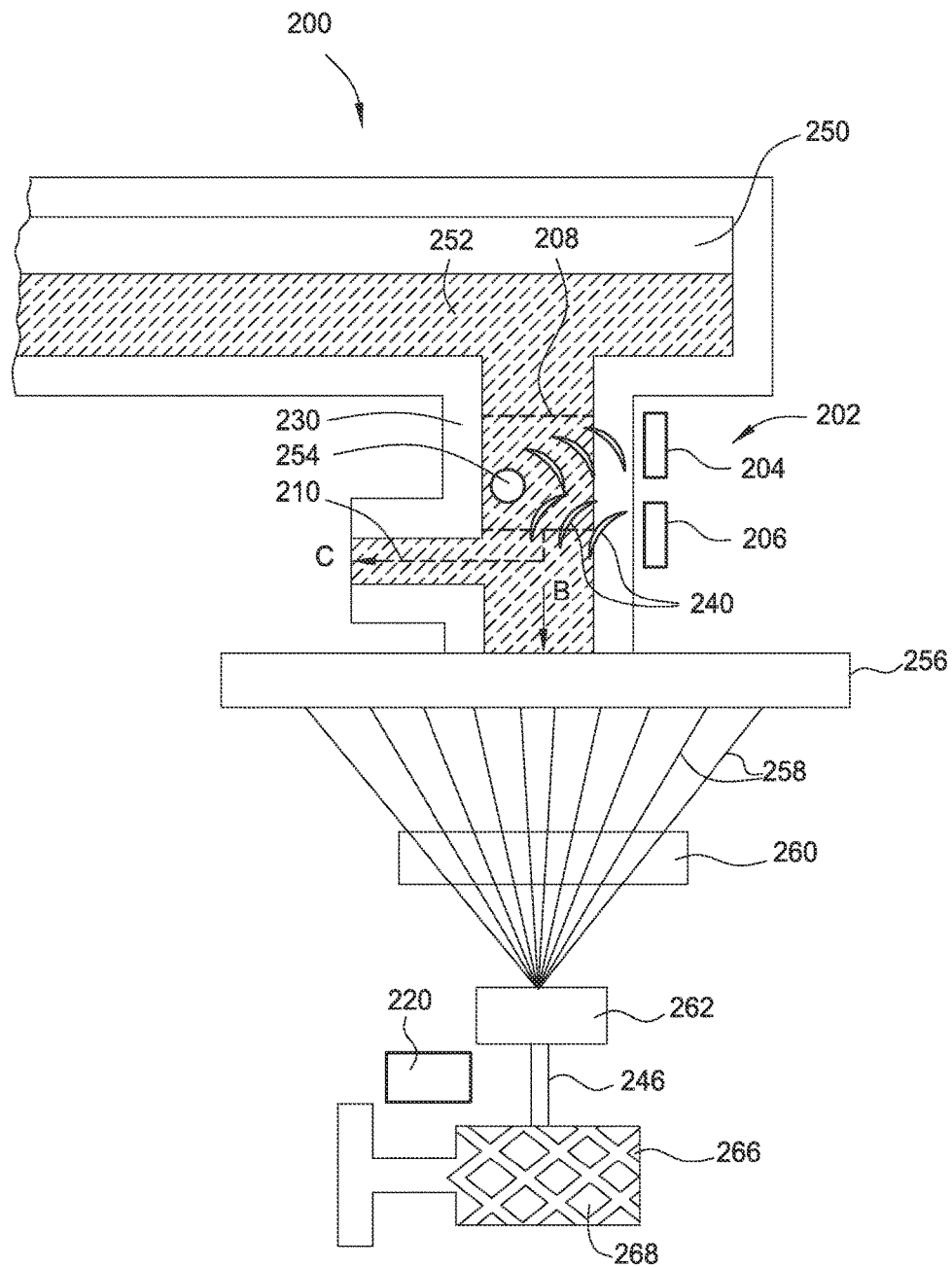
FIG. 2 is a schematic depiction of a portion of an apparatus, according to at least one embodiment, that includes a downtube, an ultrasonic sensor arranged along the downtube to detect a bubble in molten glass, and a duct for removing a slug of molten glass that contains the bubble.

FIG. 2 illustrates an embodiment of an apparatus 200 in which a downtube 230 is arranged between a forehearth 250 and a bushing 256 such that molten glass 252 passes down through the downtube 230 in the direction of arrow B to reach the bushing 256. The apparatus 200 includes an ultrasonic sensor 202 arranged along the downtube 230. The ultrasonic sensor 202 could be arranged along a designated detection region 208 of the downtube 230. The ultrasonic sensor 202 includes an ultrasonic transducer 206 and an ultrasonic receiver 204. The ultrasonic transducer 206 outputs ultrasonic energy into the downtube 230 (indicated by waves 240) and the ultrasonic receiver 204 measures a characteristic of the ultrasonic energy 240. As shown in FIG. 2, the ultrasonic transducer 206 is located downstream relative to the ultrasonic receiver 204. In various embodiments, the ultrasonic transducer 206 could be located upstream relative to the ultrasonic receiver 204. As discussed in greater detail below, the characteristic of the ultrasonic energy 240 could be a propagation time for the ultrasonic energy to leave the ultrasonic transducer 206, travel across the downtube 230, reflect off of a far wall of the downtube 230, travel across the downtube 230 a second time, and then be detected by the ultrasonic receiver 204. In the event that a bubble 254 in the molten glass 252 travels through the downtube 230, the bubble 254 can alter the characteristic of the ultrasonic energy 240. For example, the bubble 254 could cause at least some of the ultrasonic energy 240 to be reflected back toward the ultrasonic receiver 204 instead of reflecting off of the far wall of the downtube 230. As a result, that ultrasonic energy 240 would have a shortened propagation time. In various embodiments, the characteristic of the ultrasonic energy 240 could be any aspect of the ultrasonic energy that changes due to the bubble in the molten glass 252. Other examples of characteristics of the ultrasonic energy include a frequency of the ultrasonic energy, a phase of the ultrasonic energy, and a magnitude of the ultrasonic energy. In the event that a bubble 254 in the molten glass 252 is detected in the downtube 230 by the ultrasonic sensor 202, a slug of the molten glass 252 containing the bubble 254 can be directed into a duct 210 arranged along the downtube at a location that is downstream of the detection region 208. The duct 210 is selectively operable to only remove molten glass 252 from the downtube 230 when a bubble 254 is detected. Operation of the duct 210 can be timed relative to the detection of the bubble 254 based on, among other things, a flow rate of the molten glass 252 through the downtube in the direction of arrow B. For example, suppose that the duct 210 is arranged 1 inch below the detection region 208 of the downtube 230 and the molten glass is flowing at a rate of a half inch per second. In such an instance, the duct 210 would be operated two seconds after a bubble 254 is detected in the molten glass 252. Furthermore, suppose that the detection region 208 is two inches in length along the downtube 230 and a detected bubble 254 could be anywhere within that two inch length. In such an instance, a bubble at the bottom of the detection region 208 would take two seconds to reach the duct 210 and a bubble at the top of the detection region 208 would take six seconds to reach the duct 210. In this instance, the duct 210 would begin operating two seconds after a bubble 254 is detected in the detection region 208 and will continue to operate for four seconds thereafter to capture entire slug of molten glass 252 in which the bubble 254 could be contained.

In the event a bubble 254 is not detected in the molten glass 252, the molten glass 254 flows in the direction of arrow B to the bushing 256. The bushing 256 forms individual glass threads 258. Optionally, the individual glass threads 258 pass through a sizer 260, which finalizes the diameter of the individual glass threads 258. The individual glass threads 258 can be formed into a glass strand 264 by a strand former 262, which braids, twists, and/or otherwise combines the individual glass threads 258. The glass strand 264 can then be wound onto a rotating spool 266. For example, the glass strand 264 can be arranged on the spool 266 in a crisscross or woven pattern 268.

As will be discussed in greater detail below, a downtube (e.g., downtube 230) could include an additional ultrasonic sensor (e.g., ultrasonic sensor 202) located downstream of the duct 210. In the event a bubble 254 is not captured by the duct 210, the bubble 254 would pass through the bushing 256 and be formed into an individual glass thread 258, as discussed above. In various embodiments, an apparatus, such as apparatus 200 shown in FIG. 2, could include a marking module 220. The marking module 220 could spray a paint, such as a fluorescent or fluorescing paint, onto the glass strand 264 for a period of time after a bubble 254 is detected downstream of the duct 210. The period of time could be predetermined or could be calculated to mark the glass strand 264 along a length in which the elongated bubble 132' (shown in FIG. 1A) is included or could be included. Thereafter, potentially defective portions of the glass strand 264 can be identified by looking for the marked portions. The identified portions could then be removed.

In various circumstances, diverting a slug of molten glass 252 to the duct 210 to remove a bubble 254 could temporarily decrease the supply of molten glass 252 to the bushing 256. In various embodiments, after a slug of molten glass 252 has been removed via the duct 210, the winding operations performed at the bushing 256 through the winder can be slowed down (i.e., the individual glass threads 258 and strand 264 can be formed at a slower rate) for a period of time to allow the downtube 230 to refill with molten glass 252. In various other embodiments, the geometry of the downtube 230 and the viscosity of the molten glass 252 could cause the downtube 230 to refill with molten glass at a faster rate than the bushing 256 uses the molten glass 252 from the downtube 230. As a result, the winding operations could continue at a single rate both during normal operations and operations when the duct 210 is removing a slug of molten glass 252.

Figure 3:
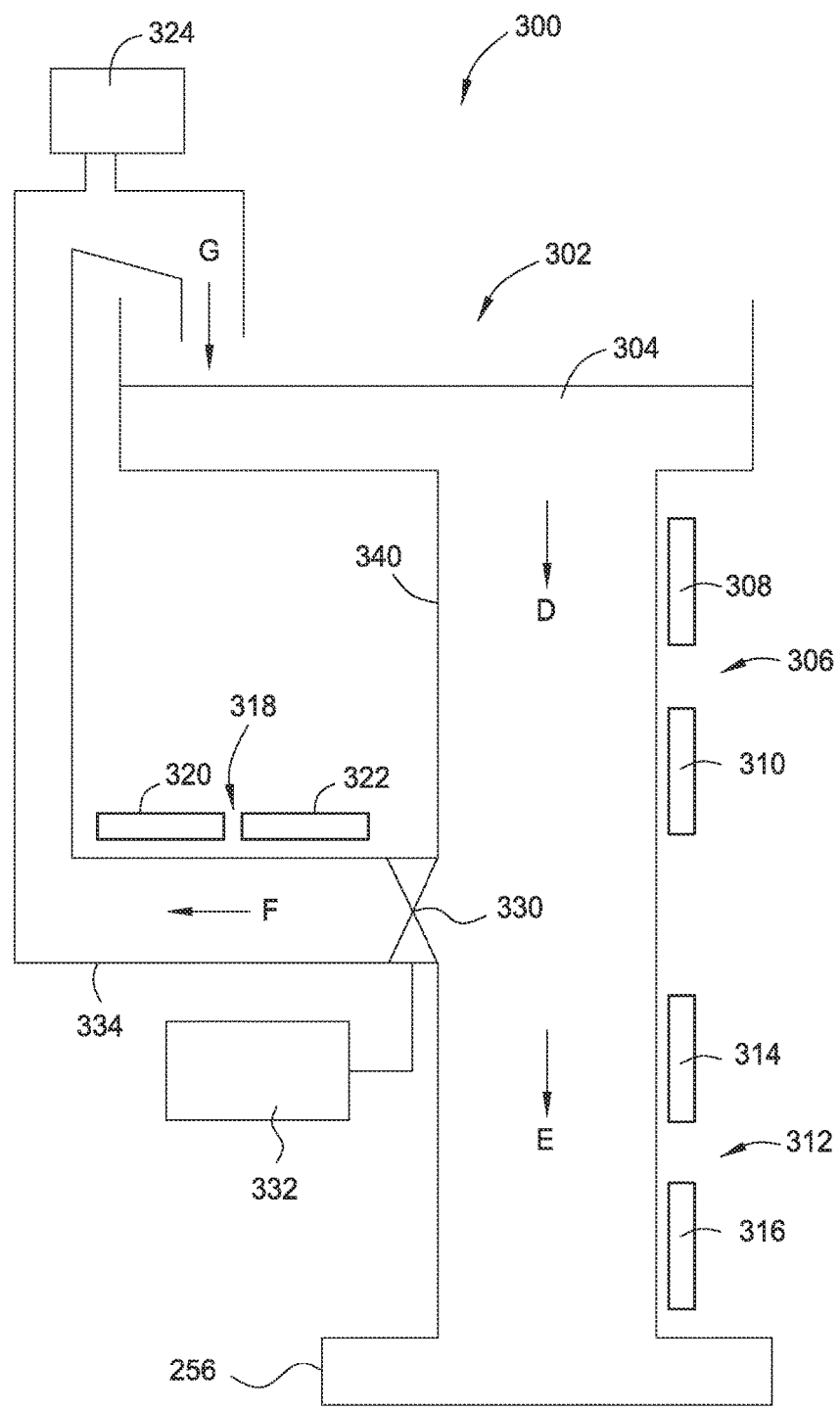
FIG. 3 is a schematic depiction of an apparatus, according to at least one embodiment, that includes a downtube, a first ultrasonic sensor arranged along the downtube to detect a bubble in molten glass, a duct for removing a slug of molten glass that contains the bubble, and that optionally includes a second ultrasonic sensor in the duct and/or an ultrasonic sensor downstream of the duct arranged along the downtube.

FIG. 3 illustrates a portion of an apparatus 300 according to at least one embodiment for forming glass strands. The apparatus 300 includes a furnace 302 (e.g., a furnace, refiner, and forehearth) with molten glass 304 therein. The molten glass 304 travels into a downtube 340 in the direction of arrow D. The downtube 340 includes a first ultrasonic sensor 306 arranged along the downtube 340. As discussed above, the ultrasonic sensor 306 includes an ultrasonic transducer 308 and ultrasonic receiver 310 that are used to detect bubbles in the molten glass 304. The ultrasonic sensor 306 can be in communication with a controller 332 that controls a valve 330. The valve 330 opens and closes a fluid path to the duct 334. In the event that the ultrasonic sensor 306 detects a bubble in the molten glass 304, the controller 332 can open the valve 330 to allow the molten glass 304 to flow into the duct 334 in the direction of arrow F. The duct 334 can be in communication with a vacuum source 324 such that when the valve 330 is opened, a slug of molten glass 304 in the downtube 340 is siphoned or sucked into the duct 334. The size or volume of the slug of molten glass 304 that is siphoned or sucked from the downtube 340 is determined at least in part by the length of time the valve 330 is opened and/or the magnitude of the vacuum provided by the vacuum source 324. In various embodiments, molten glass that is removed from the downtube 340 through the duct 334 can be returned to the furnace 302, as indicated by arrow G. The furnace 302 can reheat the molten glass removed by the duct 334. The reheating of the molten glass 304 may remove the bubble, as discussed above with reference to FIG. 1A. In various other embodiments, the molten glass that is removed from the downtube 340 through the duct 334 could be discarded or otherwise recycled.

In various embodiments, the duct 334 optionally includes a second ultrasonic sensor 318 downstream of the valve 330 that is also in communication with the controller 332. The second ultrasonic sensor 318 includes an ultrasonic transducer 320 and an ultrasonic receiver 322 to detect a bubble in the molten glass 304 in the duct 334. In the event that the first ultrasonic sensor 306 detects a bubble in the molten glass 304 and the valve 330 is opened, the second ultrasonic sensor 318 can be used to detect the bubble in the duct 334. After the bubble has been detected in the duct 334 by the second ultrasonic sensor 318, the valve 330 can be closed by the controller 332. In various embodiments, the controller 332 does not close the valve 330 until the second ultrasonic sensor 318 detects the bubble and then no longer detects the bubble, meaning the entirety of the bubble has passed into the duct 334.

In various embodiments, the downtube 340 optionally includes a third ultrasonic sensor 312 downstream of the duct 334. The third ultrasonic sensor 312 includes an ultrasonic transducer 314 and an ultrasonic receiver 316 to detect a bubble in the molten glass 304 flowing through the downtube 340 in the direction of arrow E after the duct 334. As discussed above, in the event a bubble passes through the downtube 340 in the direction of arrow E, the bubble could cause a hollow glass thread. The third ultrasonic sensor 312 could be in communication with the marking device 220, discussed above with reference to FIG. 2, and the marking device 220 could mark the individual glass threads 258 and/or the glass strand 264 in response to the third ultrasonic sensor 312 detecting a bubble in the molten glass 304.

FIGS. 4A and 4B illustrate a portion of another apparatus 400 according to various embodiments. The apparatus 400 includes a downtube 402 with a flapper valve 406 or the like arranged therein. As shown in FIG. 4A, the flapper valve 406 is usually positioned such that it blocks the duct 404 and molten glass 252 in the downtube 402 travels in the directions of arrows D and E. In the event that the ultrasonic sensor 306 detects a bubble in the molten glass 252, a controller 410 can move the flapper valve 406' to the position shown in FIG. 4B such that the flapper valve 406' blocks the downstream portion of the downtube 402 and the molten glass 252 is directed in the arrows D and F into the duct. By providing a flapper valve 406 or the like in the downtube and in the flow path of the molten glass 252, the flow of molten glass 252 may be diverted into the duct 404 (in the direction of arrow F) without requiring suction or vacuum supply, discussed above.

Figure 5A:
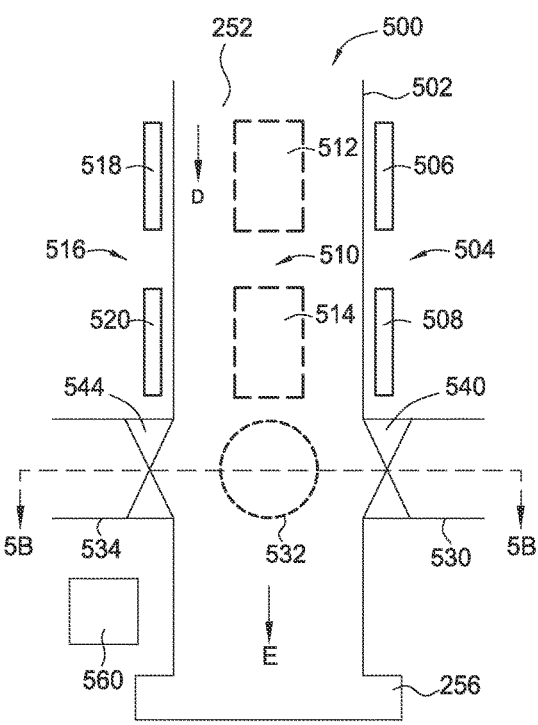
FIG. 5A is a side view of a downtube, according to at least one embodiment, having an array of ultrasonic sensors arranged around the downtube and four ducts arranged around the downtube downstream of the ultrasonic sensors.
Figure 5B:
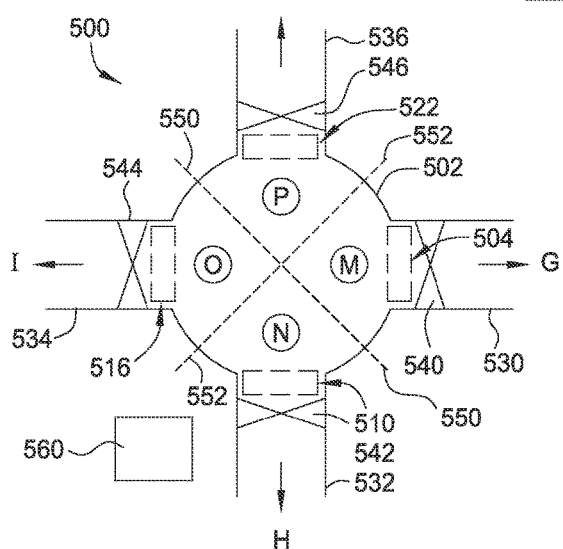
FIG. 5B is a top view of the downtube of FIG. 5A.

FIGS. 5A and 5B illustrate a portion of another apparatus 500 according to various embodiments. The apparatus 500 includes a downtube 502 that includes multiple ducts arranged around a perimeter (e.g., a circumference) of the downtube 502. In this exemplary embodiment, the downtube 502 includes a first duct 530, a second duct 532, a third duct 534, and a fourth duct 536. The first duct 530, the second duct 532, the third duct 534, and the fourth duct 536 are spaced apart by 90° from one another about the perimeter of the downtube 502. The downtube 502 also includes an array of ultrasonic sensors arranged upstream of the ducts 530, 532, 534, and 536. In this exemplary embodiment, the downtube 502 includes a first ultrasonic sensor 504, a second ultrasonic sensor 510, a third ultrasonic sensor 516, and a fourth ultrasonic sensor 522 arranged around a perimeter (e.g., a circumference) of the downtube 502. Each ultrasonic sensor includes an ultrasonic transducer and ultrasonic receiver. For example, the first ultrasonic sensor 504 includes a first ultrasonic transducer 506 and a first ultrasonic receiver 508. As another example, the second ultrasonic sensor 510 includes a second ultrasonic transducer 512 and a second ultrasonic receiver 514. As another example, the third ultrasonic sensor 516 includes a third ultrasonic transducer 518 any third ultrasonic receiver 520. In the exemplary embodiment, the ultrasonic sensors 504, 510, 516, and 522 are aligned with respective ones of the ducts 530, 532, 534, and 536. In various other embodiments, the ultrasonic sensors could be arranged out of alignment with the ducts.

In the exemplary apparatus 500, the four ultrasonic sensors 504, 510, 516, and 522 divide the downtube 502 into four detection regions, which have boundaries indicated by dashed lines 550 and 552 and labeled "M," "N," "O," and "P" in FIG. 5B. The array of ultrasonic sensors around the downtube 502 can be used to identify a detection region or detection regions in which a bubble 254 in the molten glass 252 is located. A controller 560 can operate valves in the duct(s) that are closest to the detected location of the bubble. For example, referring to FIG. 5B, if a bubble is detected in the molten glass 252 in detection region "M," a valve 540 in the first duct 530 can be opened to siphon at least a slug of molten glass 252 located in region "M" into the first duct 530, indicated by arrow G. As another example, if a bubble is detected in region "N," a valve 542 in the second duct 532 can be opened to siphon at least a slug of molten glass 252 located in region "N" into the second duct 532, indicated by arrow H. As another example, if a bubble is detected in region "O," a valve 544 in the third duct 534 can be opened to siphon at least a slug of molten glass 252 located in region "O" into the third duct 534, indicated by arrow I. As another example, if a bubble is detected in region "P," a valve 546 in the fourth duct 536 can be opened to siphon at least a slug of molten glass 252 located in region "P" into the fourth duct 536, indicated by arrow J. In various circumstances, a plurality of valves could be opened to siphon molten glass 252 from the downtube 502. For example, a bubble 254 in the molten glass 252 could span multiple detection regions. To illustrate, suppose that a bubble 254 is detected in the molten glass 252 and that the bubble 254 is partially located in detection region "N" and partially located in detection region "O." In such a circumstance, the valve 542 in the second duct 532 and the valve 544 in the duct 534 could both be opened to extract at least a slug of molten glass 252 located in regions "N" and "O."

Figure 6:
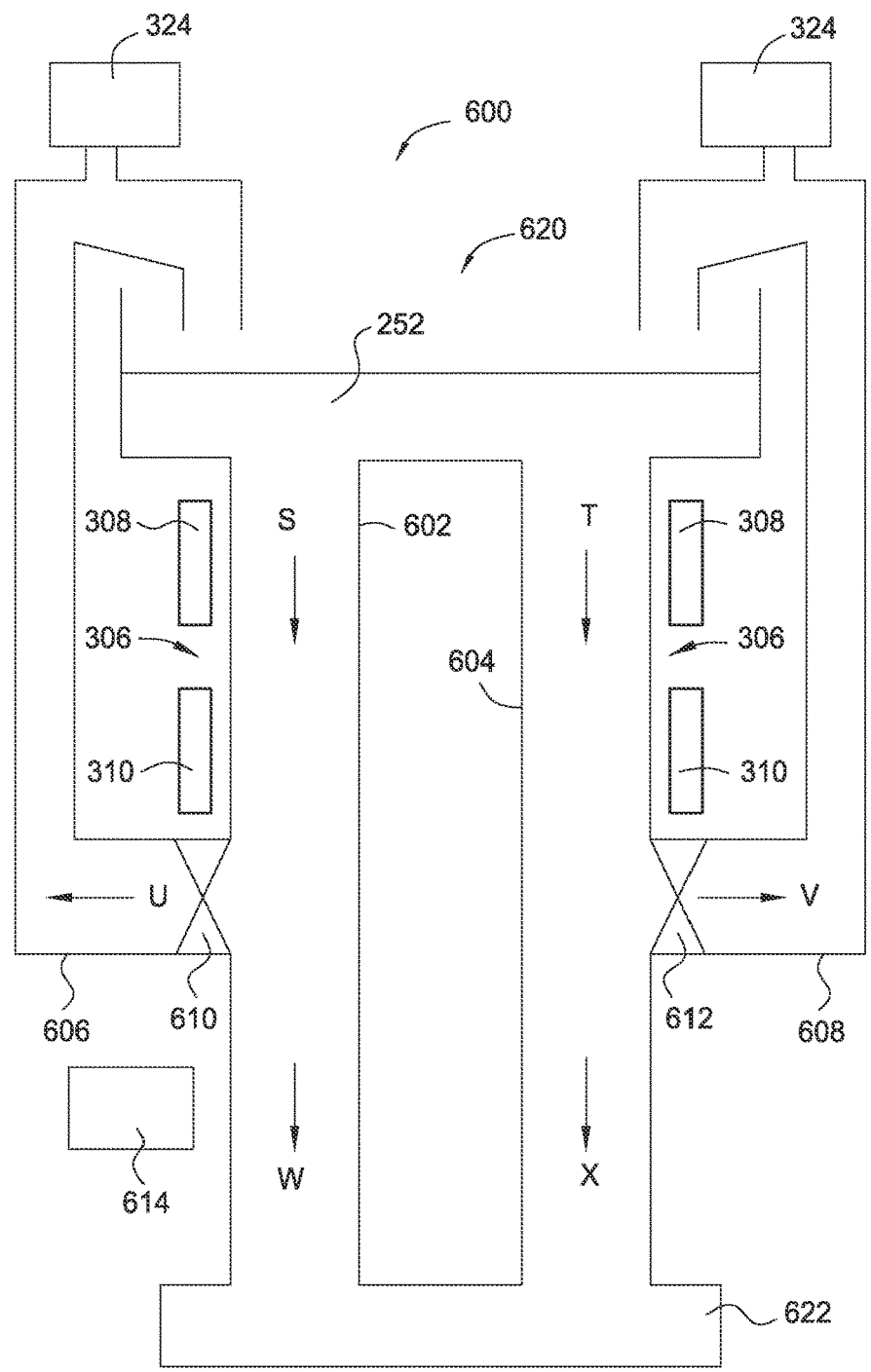
FIG. 6 is a schematic view of an apparatus, according to at least one embodiment, having two downtubes connecting a furnace to a bushing for extruding glass fibers, wherein each downtube has a dedicated duct for removing a slug of molten glass containing a bubble.

As discussed above, in various circumstances, removing a slug of molten glass from the downtube could result in a momentary interruption in the supply of molten glass 130 to the bushing 256. FIG. 6 illustrates a portion of an apparatus 600 that includes a forehearth 620 in fluid communication with a bushing 622 via a first downtube 602 and a second downtube 602. The first downtube 602 includes an ultrasonic sensor 306 arranged along the downtube 602 and a duct 606 arranged downstream of the ultrasonic sensor 306. The duct 606 includes a valve 610 that can be opened by a controller 614 to siphon a slug of molten glass 252 traveling through the downtube 602 in the direction indicated by arrow S in the event that the ultrasonic sensor 360 detects a bubble in the molten glass 252 traveling through the first downtube 602. The second downtube 604 also includes an ultrasonic sensor 306 arranged along the downtube 604 and a duct 608 arranged downstream of the ultrasonic sensor 306. The duct 608 includes a valve 612 that can be opened by the controller 614 to siphon a slug of molten glass 252 traveling through the downtube 604 in the direction indicated by arrow T in the event that the ultrasonic sensor 306 detects a bubble in the molten glass 252 traveling through the second downtube 604.

Under normal operation, the first downtube 602 supplies the bushing 622 with molten glass, as indicated by arrow W, and the second downtube 604 supplies the bushing 622 with molten glass, as indicated by arrow X. In the event that a bubble is detected in the molten glass traveling through one of the downtubes, the other downtube could continue to supply molten glass 252 to the bushing to 622. For example, suppose that a bubble is detected in the molten glass 252 by the ultrasonic sensor 306 arranged in the first downtube 602 and the controller 614 operates the valve 610 to remove a slug of molten glass 252 from the first downtube 602. In such a scenario, molten glass 252 would continue to flow uninterrupted through the second downtube 604 in the direction of arrow X to the bushing 622. As another example, suppose that a bubble is detected in the molten glass 252 by the ultrasonic sensor 306 arranged in the second downtube 604 and the controller 614 operates the valve 612 to remove a slug of molten glass 252 from the second downtube 604. In such a scenario, molten glass 252 would continue to flow interrupted through the first downtube 602 in the direction of arrow W to the bushing 622.

Figure 7A:
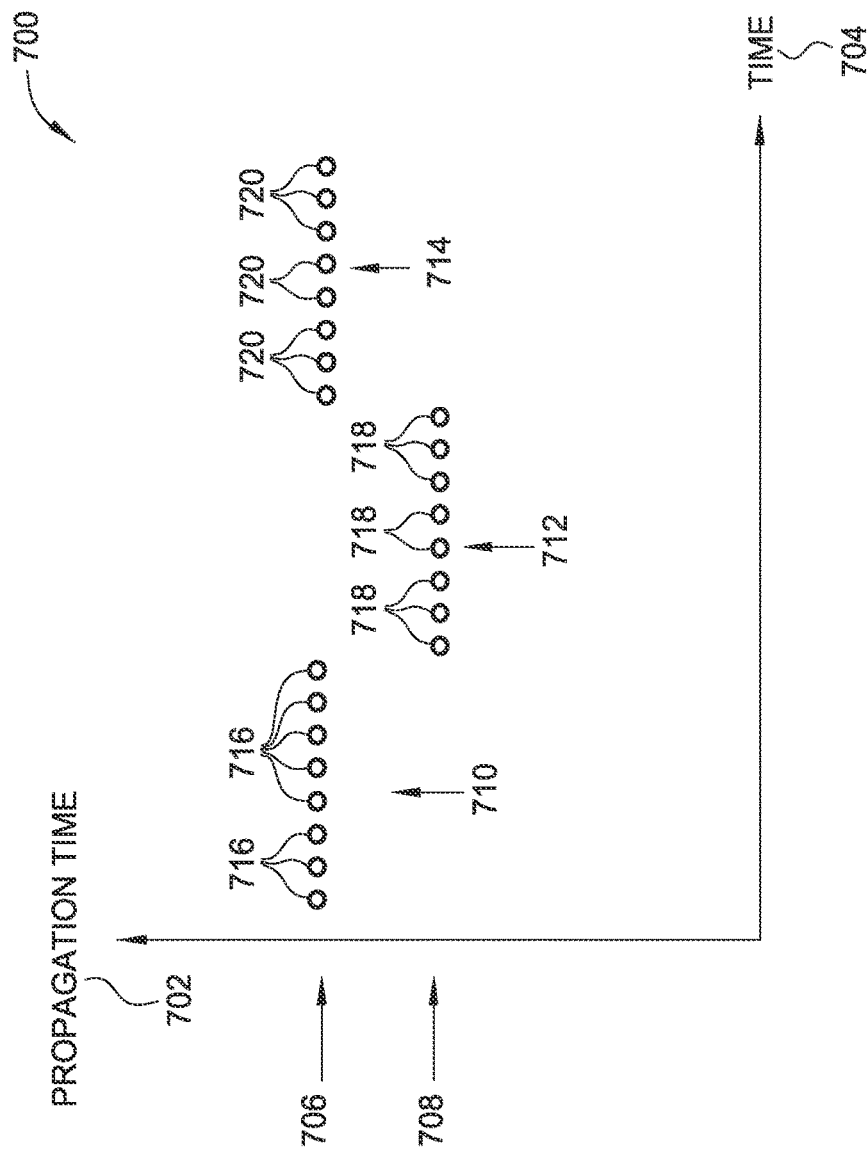
FIG. 7A is a chart of exemplary data from a ultrasonic sensors detecting a bubble in molten glass.

As discussed above, the ultrasonic sensors can detect a bubble in the molten glass by detecting changes to one or more characteristics of the ultrasonic energy traveling through the molten glass. For example, an ultrasonic sensor could measure a propagation time characteristic for the ultrasonic energy by emitting ultrasonic energy using an ultrasonic transducer and detecting when the ultrasonic energy returns (e.g., is reflected back) to the ultrasonic sensor using an ultrasonic receiver. The amount of time from when the energy is emitted to when the energy is detected is the propagation time. FIG. 7A illustrates a graph 700 showing measured propagation time 702 (measured by an ultrasonic sensor) on a vertical axis and time 704 on the horizontal axis. The ultrasonic sensor may periodically emit ultrasonic energy and detect its propagation time. For example, the ultrasonic sensor could emit and detect the ultrasonic energy once per second (i.e., one Hertz), ten times per second (i.e., 10 Hz), or a different interval. As shown in FIG. 7A, for a first period of time 710, a first series of data points 716 for the ultrasonic sensor have a propagation time 706 of a first duration. The first period of time 710 is an expected period of time required for ultrasonic energy to be transmitted by an ultrasonic transducer, travel across the downtube, reflect off a far wall of the downtube, travel across the downtube again, and be received by an ultrasonic receiver. Then, for a second period of time 712, a second series of data points 718 for the ultrasonic sensor have a propagation time 708 of a second duration. Then, for a third period of time 714, a third series of data points 720 for the ultrasonic sensor have a propagation time 706 of the first duration. The period of time 712 in which the propagation time 708 is of the second duration could indicate the presence of a bubble in the molten glass. For example, boundaries of the bubble could reflect the ultrasonic energy back to the ultrasonic sensor sooner (i.e., a shorter period of time than the expected period of time) than if the ultrasonic energy travels all the way across the downtube to a far wall then reflects back. The third period of time 714 in which the propagation time 706 has returned to the first duration (i.e., the expected period of time) could indicate that the bubble in the molten glass is no longer being detected.

In various embodiments, a length of time of the second period of time 712 could be used to estimate the size of the bubble. For example, suppose that the molten glass is moving through the downtube at a speed of a half inch per second and that the length of time of the second period of time 712 is two seconds long. The vertical dimension of the bubble would therefore be 1 inch. If the bubble is assumed to be spherical in shape, then the volume of the bubble could be calculated as a sphere having a diameter of 1 inch. The calculated volume of the bubble could be used to calculate a length of time to open a valve for a duct to siphon off a slug of molten glass.

Figure 7B:
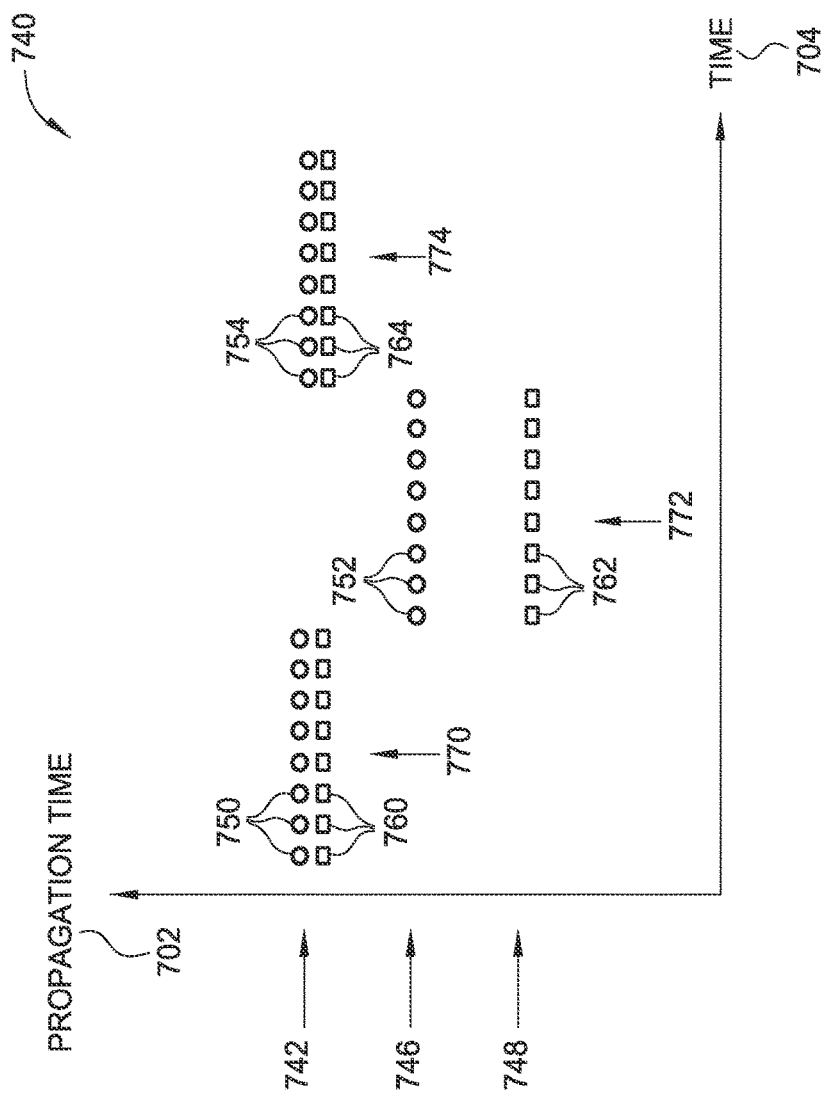
FIG. 7B is a chart of exemplary data from an array of two ultrasonic sensors detecting a bubble in molten glass.

As discussed above, an array of ultrasonic sensors could be used to detect a position of a bubble in the downtube. FIG. 7B illustrates a graph 740 showing measured propagation time 702 on a vertical axis and time 704 on the horizontal axis. Here, the graph 740 shows measured propagation time 702 for a first ultrasonic sensor and a second ultrasonic sensor arranged on opposite sides of the downtube. As shown in FIG. 7B, for a first period of time 770, a first series of data points 750 for the first ultrasonic sensor and a first series of data points 764 the second ultrasonic sensor have a propagation time 742 of the first duration. As shown in FIG. 7B, the duration times detected by the first ultrasonic sensor and the second ultrasonic sensor could be different or could be the same. Here, for illustration and clarity purposes, the duration times detected by the first ultrasonic sensor and the second ultrasonic sensor are shown to be different. For a second period of time 772, a second series of data points 752 for the first ultrasonic sensor have a propagation time 746 of a second duration and a second series of data points 762 for the second ultrasonic sensor have a propagation time 748 of a third duration. Here, the third duration is shorter than the second duration. Then, for the third period of time 774, a third series of data points 754 for the first ultrasonic sensor have a propagation time 742 of the first duration and a third series of data points 764 for the second ultrasonic sensor have a propagation time 742 of the first duration. The period of time 762 in which the propagation time 746 for the first ultrasonic sensor is the second duration and the propagation time 748 for the second ultrasonic sensor is the third duration indicates the presence of a bubble in the molten glass. Furthermore, because the propagation time 748 of the third duration, detected by the second ultrasonic sensor, is less than the propagation time 746 of the second duration, detected by the first ultrasonic sensor, the detected bubble is closer to the second ultrasonic sensor in the downtube. Again, the third period of time 774 in which the propagation times 742 detected by the ultrasonic sensors has returned to the first duration could indicate that the bubble in the molten glass is no longer being detected.

As discussed above with reference to FIG. 7A, a length of time of the second period of time 772 could be used to estimate a vertical size of the bubble. Furthermore, the differences in detected propagation time by the first ultrasonic sensor and the second ultrasonic sensor could be used to estimate a lateral dimension of the bubble. For example, in various embodiments, the ultrasonic sensors could be calibrated such that a particular propagation time corresponds to a particular location of a boundary of a bubble in the downtube. Such calibration data could be used to calculate and/or estimate boundaries of the bubble closest to each of the ultrasonic sensors to estimate a horizontal size of the bubble.

As discussed above with reference to FIGS. 5A and 5B, four or more ultrasonic sensors could be arranged around the downtube. Such an array of ultrasonic sensors could provide a location of a bubble in the molten glass in the downtube in multiple axes. Also, such an array of ultrasonic sensors could provide a more accurate estimate of a volume of the bubble by estimating and/or calculating dimensions of the bubble in the multiple axes.

The embodiments described above have been discussed with reference to molten glass 252. In various embodiments, bubbles could be detected and removed from other molten substrates, such as molten plastic.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." As discussed above with respect to various embodiments, a duct in a downtube can be operated by a controller. The controller could include a processor and computer memory. The computer memory could store a computer program that is executable by the processor to analyze data from the ultrasonic sensor(s) to detect a bubble in the molten substrate. In response to detecting a bubble, the controller could operate an actuator to open a valve or move a flapper valve, for example. The computer memory could also store a program or programs executable by the computer processor to calculate a size of the bubble and/or a position of the bubble in the downtube, discussed above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An apparatus for supplying a molten substrate, the apparatus comprising:
a downtube adapted to receive the molten substrate at an upstream end of the downtube and to distribute the molten substrate at a downstream end of the downtube;
an ultrasonic sensor arranged along the downtube, wherein the ultrasonic sensor is operable to detect bubbles in the molten substrate in the downtube; and
a duct arranged along the downtube, wherein the duct is operable to remove a slug of the molten substrate from the downtube upon the ultrasonic sensor detecting a bubble in the molten substrate.

2. The apparatus of claim 1, wherein the slug of molten substrate removed from the downtube includes the detected bubble.

3. The apparatus of claim 1, further comprising:
a valve arranged in the duct, wherein the valve is movable between an open position and a closed position, and wherein molten substrate can pass through the valve when the valve is in the open position;

a vacuum arranged downstream of the valve, wherein the vacuum siphons the slug of molten substrate into the duct when the valve is in the open position; and a controller communicatively connected to the ultrasonic sensor and programmed to move the valve to the open position upon receiving a signal representing the ultrasonic sensor detecting the bubble in the slug of molten substrate.

4. The apparatus of claim 3, further comprising a second ultrasonic sensor arranged along the duct downstream of the valve, wherein the second ultrasonic sensor is operable to detect bubbles in molten substrate in the duct, and wherein the controller is communicatively connected to the second ultrasonic sensor and programmed to move the valve to the closed position upon receiving a signal representing the second ultrasonic detector detecting the bubble in the duct.

5. The apparatus of claim 1, further comprising:
a diverting valve arranged along the downtube, wherein the diverting valve is movable between a stowed position and a diverting position, and wherein the diverting valve diverts molten substrate into the duct when the diverting valve is in the diverting position; and
a controller operable to move the diverting valve to the diverting position upon the ultrasonic sensor detecting the bubble in the slug of molten substrate.

6. The apparatus of claim 5, further comprising a second ultrasonic sensor arranged along the duct downstream of the diverting valve, wherein the second ultrasonic sensor is operable to detect bubbles in molten substrate in the duct, and wherein the controller is operable to move the diverting valve to the stowed position upon the second ultrasonic detector detecting the bubble in the duct.

7. The apparatus of claim 1, further comprising a second ultrasonic sensor arranged along the downtube downstream of the duct.

8. The apparatus of claim 1, wherein the ultrasonic sensor comprises an array of ultrasonic sensors arranged around a perimeter of the downtube, and wherein the duct is operable to remove the slug of molten substrate from the downtube upon at least one of the ultrasonic sensors detecting the bubble in the slug of molten substrate.

9. The apparatus of claim 8, further comprising a controller operable to detect a position of the bubble in the downtube, and wherein the duct comprises a plurality of ducts arranged around a perimeter of the downtube, wherein the plurality of ducts include respective valves arranged in the ducts, and wherein the controller is operable to open at least one of the valves associated with at least one duct that is closest to the detected position of the bubble in the downtube.

10. The apparatus of claim 1, wherein the molten substrate comprises one of: molten glass, molten electronic grade glass, and molten plastic.

11. An apparatus for forming fibers from a molten substrate, the apparatus comprising:
a furnace operable to melt a substrate supply into a molten substrate;
a downtube that includes an upstream opening and a downstream opening, wherein the upstream opening is in fluid communication with an outlet of the furnace, the downtube including:
an ultrasonic sensor arranged along the downtube, wherein the ultrasonic sensor is operable to detect bubbles in the molten substrate in the downtube; and
a duct arranged along the downtube, wherein the duct is operable to remove a slug of molten substrate upon the ultrasonic sensor detecting a bubble in the slug of molten substrate;
a bushing in fluid communication with the downstream end of the downtube, wherein the bushing includes a plurality of extrusion ports therethrough; and
a winding apparatus operable to pull threads of molten substrate through the extrusion ports and form the threads into a winding of threads.

12. The apparatus of claim 11, wherein the slug of molten substrate removed from the downtube includes the detected bubble.

13. The apparatus of claim 11, further comprising a second downtube that includes an upstream end opening and a downstream opening, wherein the upstream opening of the downtube is in fluid communication with an outlet from the furnace, and wherein the downstream opening of the second downtube is in fluid communication with the bushing, the second downtube including:
a second ultrasonic sensor arranged along the second downtube, wherein the second ultrasonic sensor is operable to detect bubbles in the molten substrate in the second downtube; and
a second duct arranged along the second downtube, wherein the second duct is operable to remove a slug of molten substrate upon the second ultrasonic sensor detecting a bubble in the slug of molten substrate in the second downtube.

14. The apparatus of claim 11, wherein the winding apparatus pulls the threads of molten substrate at a reduced rate while the duct removes the slug of molten substrate.

15. The apparatus of claim 11, further comprising a second ultrasonic sensor arranged along the downtube at a downstream location relative to the duct, wherein the second ultrasonic sensor is operable to detect bubbles in the molten substrate at the downstream location, and wherein the winding apparatus is operable to mark a length of the formed threads after the second ultrasonic sensor detects a bubble in the molten substrate at the downstream location.

* * * * *